(12) United States Patent
Salter et al.

US009593820B1

(10) Patent No.: US 9,593,820 B1
(45) Date of Patent: Mar. 14, 2017

(54) VEHICLE ILLUMINATION SYSTEM

(71) Applicant: Ford Global Technologies, LLC, Dearborn, MI (US)

(72) Inventors: Stuart C. Salter, White Lake, MI (US); Aaron Bradley Johnson, Allen Park, MI (US); Paul Kenneth Dellock, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/278,204

(22) Filed: Sep. 28, 2016

(51) Int. Cl.
*B60Q 1/00* (2006.01)
*B60Q 1/26* (2006.01)
*F21S 8/10* (2006.01)
*B60Q 1/32* (2006.01)

(52) U.S. Cl.
CPC ........ *F21S 48/2212* (2013.01); *B60Q 1/2661* (2013.01); *B60Q 1/323* (2013.01); *F21S 48/214* (2013.01); *F21S 48/328* (2013.01); *B60Q 2400/40* (2013.01)

(58) Field of Classification Search
CPC ...... B60Q 1/26; B60Q 1/2619; B60Q 1/2661; B60Q 1/2696; B60Q 1/32; B60Q 1/323; B60Q 1/326; F21S 48/215; F21S 48/22; F21S 48/2212; F21S 48/328
USPC .................................. 362/487, 501, 509–511
See application file for complete search history.

(56) References Cited

U.S. PATENT DOCUMENTS

| | | |
|---|---|---|
| 3,259,052 A | 7/1966 | Bradley et al. |
| 4,558,635 A | 12/1985 | Dick |
| 5,709,453 A | 1/1998 | Krent et al. |
| 6,031,511 A | 2/2000 | DeLuca et al. |
| 6,117,362 A | 9/2000 | Yen et al. |
| 6,494,490 B1 | 12/2002 | Trantoul |
| 6,577,073 B2 | 6/2003 | Shimizu et al. |
| 6,729,738 B2 | 5/2004 | Fuwausa et al. |
| 6,737,964 B2 | 5/2004 | Samman et al. |
| 6,773,129 B2 | 8/2004 | Anderson, Jr. et al. |
| 6,820,888 B1 | 11/2004 | Griffin |
| 6,851,840 B2 | 2/2005 | Ramamurthy et al. |
| 6,859,148 B2 | 2/2005 | Miller |
| 6,871,986 B2 | 3/2005 | Yamanaka et al. |
| 6,953,536 B2 | 10/2005 | Yen et al. |

(Continued)

FOREIGN PATENT DOCUMENTS

| | | |
|---|---|---|
| CN | 201125645 | 11/2007 |
| CN | 101337492 A | 1/2009 |

(Continued)

OTHER PUBLICATIONS

Corvette Exterior Styling; www.corvette7tuning.com; Apr. 4, 2016; 3 pages.

(Continued)

*Primary Examiner* — Jason Moon Han
(74) *Attorney, Agent, or Firm* — Jason Rogers; Price Heneveld LLP

(57) ABSTRACT

A vehicle is provided which includes a first panel defining a vent and a second panel positioned proximate the first panel. A lighting assembly is positioned within the vent including a first plurality and a second plurality of light sources. A heat sink is thermally coupled with the first and second plurality of light sources. An optical member is optically coupled to the first and second plurality of light sources. A photoluminescent structure is positioned on the second panel.

20 Claims, 6 Drawing Sheets

(56) References Cited

U.S. PATENT DOCUMENTS

| | | |
|---|---|---|
| 6,990,922 B2 | 1/2006 | Ichikawa et al. |
| 7,161,472 B2 | 1/2007 | Strumolo et al. |
| 7,213,923 B2 | 5/2007 | Liu et al. |
| 7,264,366 B2 | 9/2007 | Hulse |
| 7,264,367 B2 | 9/2007 | Hulse |
| 7,441,914 B2 | 10/2008 | Palmer et al. |
| 7,501,749 B2 | 3/2009 | Takeda et al. |
| 7,575,349 B2 | 8/2009 | Bucher et al. |
| 7,745,818 B2 | 6/2010 | Sofue et al. |
| 7,753,541 B2 | 7/2010 | Chen et al. |
| 7,834,548 B2 | 11/2010 | Jousse et al. |
| 7,862,220 B2 | 1/2011 | Cannon et al. |
| 7,987,030 B2 | 7/2011 | Flores et al. |
| 8,016,465 B2 | 9/2011 | Egerer et al. |
| 8,022,818 B2 | 9/2011 | la Tendresse et al. |
| 8,071,988 B2 | 12/2011 | Lee et al. |
| 8,097,843 B2 | 1/2012 | Agrawal et al. |
| 8,136,425 B2 | 3/2012 | Bostick |
| 8,163,201 B2 | 4/2012 | Agrawal et al. |
| 8,178,852 B2 | 5/2012 | Kingsley et al. |
| 8,197,105 B2 | 6/2012 | Yang |
| 8,203,260 B2 | 6/2012 | Li et al. |
| 8,207,511 B2 | 6/2012 | Bortz et al. |
| 8,232,533 B2 | 7/2012 | Kingsley et al. |
| 8,247,761 B1 | 8/2012 | Agrawal et al. |
| 8,286,378 B2 | 10/2012 | Martin et al. |
| 8,408,766 B2 | 4/2013 | Wilson et al. |
| 8,415,642 B2 | 4/2013 | Kingsley et al. |
| 8,421,811 B2 | 4/2013 | Odland et al. |
| 8,466,438 B2 | 6/2013 | Lambert et al. |
| 8,519,359 B2 | 8/2013 | Kingsley et al. |
| 8,519,362 B2 | 8/2013 | Labrot et al. |
| 8,552,848 B2 | 10/2013 | Rao et al. |
| 8,606,430 B2 | 12/2013 | Seder et al. |
| 8,624,716 B2 | 1/2014 | Englander |
| 8,631,598 B2 | 1/2014 | Li et al. |
| 8,664,624 B2 | 3/2014 | Kingsley et al. |
| 8,683,722 B1 | 4/2014 | Cowan |
| 8,724,054 B2 | 5/2014 | Jones |
| 8,754,426 B2 | 6/2014 | Marx et al. |
| 8,773,012 B2 | 7/2014 | Ryu et al. |
| 8,846,184 B2 | 9/2014 | Agrawal et al. |
| 8,876,352 B2 | 11/2014 | Robbins et al. |
| 8,952,341 B2 | 2/2015 | Kingsley et al. |
| 9,006,751 B2 | 4/2015 | Kleo et al. |
| 9,057,021 B2 | 6/2015 | Kingsley et al. |
| 9,065,447 B2 | 6/2015 | Buttolo et al. |
| 9,187,034 B2 | 11/2015 | Tarahomi et al. |
| 9,299,887 B2 | 3/2016 | Lowenthal et al. |
| 2002/0159741 A1 | 10/2002 | Graves et al. |
| 2002/0163792 A1 | 11/2002 | Formoso |
| 2003/0179548 A1 | 9/2003 | Becker et al. |
| 2004/0213088 A1 | 10/2004 | Fuwausa |
| 2006/0087826 A1 | 4/2006 | Anderson, Jr. |
| 2006/0097121 A1 | 5/2006 | Fugate |
| 2007/0032319 A1 | 2/2007 | Tufte |
| 2007/0285938 A1 | 12/2007 | Palmer et al. |
| 2009/0219730 A1 | 9/2009 | Syfert et al. |
| 2009/0251920 A1 | 10/2009 | Kino et al. |
| 2009/0260562 A1 | 10/2009 | Folstad et al. |
| 2009/0262515 A1 | 10/2009 | Lee et al. |
| 2009/0298406 A1 | 12/2009 | Norbury, Jr. et al. |
| 2011/0012062 A1 | 1/2011 | Agrawal et al. |
| 2012/0001406 A1 | 1/2012 | Paxton et al. |
| 2012/0104954 A1 | 5/2012 | Huang |
| 2012/0183677 A1 | 7/2012 | Agrawal et al. |
| 2012/0280528 A1 | 11/2012 | Dellock et al. |
| 2013/0335994 A1 | 12/2013 | Mulder et al. |
| 2014/0065442 A1 | 3/2014 | Kingsley et al. |
| 2014/0103258 A1 | 4/2014 | Agrawal et al. |
| 2014/0264396 A1 | 9/2014 | Lowenthal et al. |
| 2014/0266666 A1 | 9/2014 | Habibi |
| 2014/0373898 A1 | 12/2014 | Rogers et al. |
| 2015/0046027 A1 | 2/2015 | Sura et al. |
| 2015/0138789 A1 | 5/2015 | Singer et al. |
| 2015/0267881 A1 | 9/2015 | Salter et al. |
| 2016/0016506 A1 | 1/2016 | Collins et al. |

FOREIGN PATENT DOCUMENTS

| | | |
|---|---|---|
| CN | 201169230 Y | 2/2009 |
| CN | 201193011 Y | 2/2009 |
| DE | 29708699 U1 | 7/1997 |
| DE | 10319396 A1 | 11/2004 |
| EP | 1762428 A1 | 3/2007 |
| EP | 1793261 A1 | 6/2007 |
| EP | 2778209 A1 | 9/2014 |
| JP | 2000159011 A | 6/2000 |
| JP | 2007238063 A | 9/2007 |
| WO | 2006047306 A1 | 5/2006 |
| WO | 2014068440 A1 | 5/2014 |

OTHER PUBLICATIONS

Cadillac SRX and Its Illuminated Side Fender Vents; gmauthority.com; Apr. 4, 2016; 3 pages.

US 9,593,820 B1

VEHICLE ILLUMINATION SYSTEM

FIELD OF THE INVENTION

The present disclosure generally relates to vehicle lighting systems, and more particularly, to vehicle lighting systems employing photoluminescent structures.

BACKGROUND OF THE INVENTION

Illumination arising from photoluminescent materials offers a unique and attractive viewing experience. It is therefore desired to incorporate such photoluminescent materials in portions of vehicles to provide accent lighting.

SUMMARY OF THE INVENTION

According to one aspect of the present disclosure, a vehicle is provided which includes a first panel defining a vent and a second panel positioned proximate the first panel. A lighting assembly is positioned within the vent including a first plurality and a second plurality of light sources. A heat sink is thermally coupled with the first and second plurality of light sources. An optical member is optically coupled to the first and second plurality of light sources. A photoluminescent structure is positioned on the second panel.

According to another aspect of the present disclosure, a vehicle is provided which includes a first panel defining a vent and a second panel positioned proximate the vent. A lighting assembly is positioned within the vent includes a first plurality and a second plurality of light sources. An optical member is optically coupled to the first and second plurality of light sources. A photoluminescent structure is positioned on the second panel.

According to yet another aspect of the present disclosure, a vehicle includes a fender panel defining a vent and a wheel well. A lighting assembly is positioned within the vent including a plurality of light sources. An optical member is optically coupled to the plurality of light sources. A photoluminescent structure is positioned proximate the vent. The optical member is configured to emit light from the plurality of light sources toward the wheel well and the photoluminescent structure.

These and other aspects, objects, and features of the present invention will be understood and appreciated by those skilled in the art upon studying the following specification, claims, and appended drawings.

DETAILED DESCRIPTION OF THE PREFERRED EMBODIMENTS

As required, detailed embodiments of the present disclosure are disclosed herein. However, it is to be understood that the disclosed embodiments are merely exemplary of the disclosure that may be embodied in various and alternative forms. The figures are not necessarily to a detailed design and some schematics may be exaggerated or minimized to show function overview. Therefore, specific structural and functional details disclosed herein are not to be interpreted as limiting, but merely as a representative basis for teaching one skilled in the art to variously employ the present disclosure.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

Figure 1A:
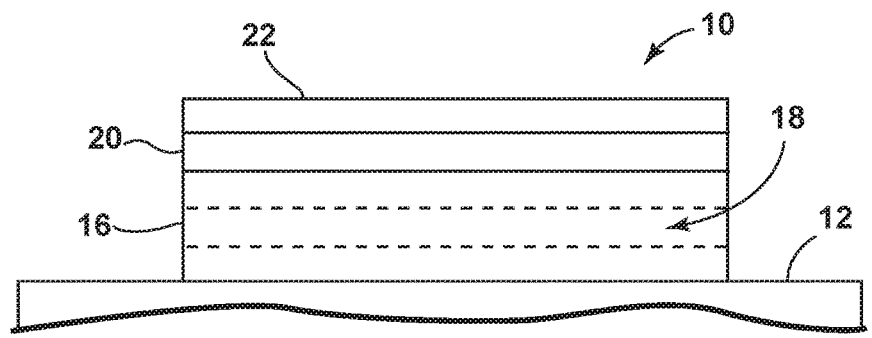
FIG. 1A is a side view of a photoluminescent structure rendered as a coating for use in a vehicle light strip according to one embodiment.
Figure 1B:
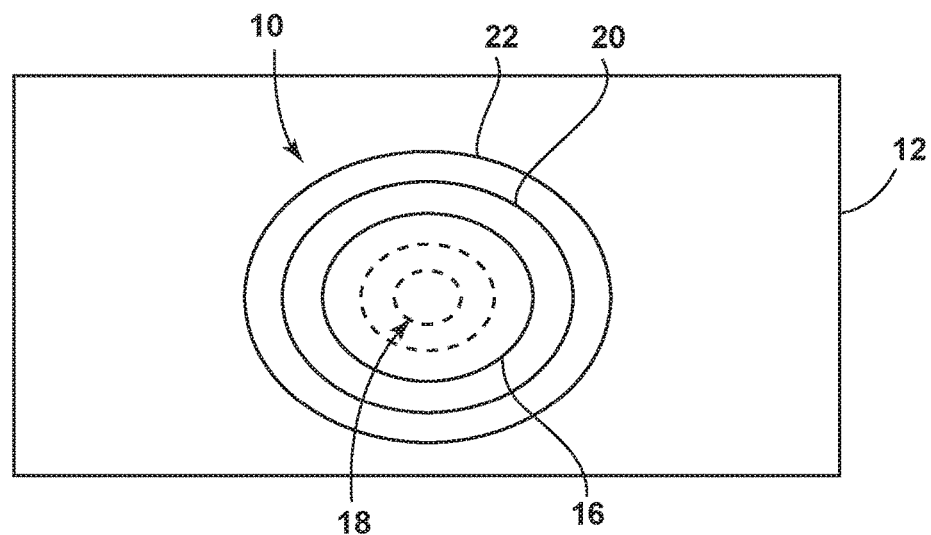
FIG. 1B is a top view of a photoluminescent structure rendered as a discrete particle according to one embodiment.
Figure 1C:
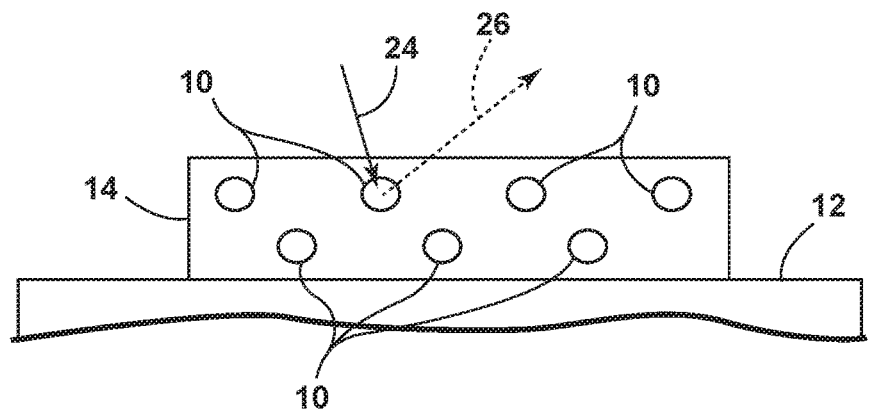
FIG. 1C is a side view of a plurality of photoluminescent structures rendered as discrete particles and incorporated into a separate structure.

Referring to FIGS. 1A-1C, various exemplary embodiments of photoluminescent structures 10 are shown, each capable of being coupled to a substrate 12, which may correspond to a vehicle fixture or vehicle related piece of equipment. In FIG. 1A, the photoluminescent structure 10 is generally shown rendered as a coating (e.g., a film) that may be applied to a surface of the substrate 12. In FIG. 1B, the photoluminescent structure 10 is generally shown as a discrete particle capable of being integrated with a substrate 12. In FIG. 1C, the photoluminescent structure 10 is generally shown as a plurality of discrete particles that may be incorporated into a support medium 14 (e.g., a film) that may then be applied (as shown) or integrated with the substrate 12.

At the most basic level, a given photoluminescent structure 10 includes an energy conversion layer 16 that may include one or more sublayers, which are exemplarily shown through broken lines in FIGS. 1A and 1B. Each sublayer of the energy conversion layer 16 may include one or more photoluminescent materials 18 having energy converting elements with phosphorescent or fluorescent properties. Each photoluminescent material 18 may become excited upon receiving an excitation emission 24 of a specific wavelength, thereby causing the light to undergo a conversion process. Under the principle of down conversion, the excitation emission 24 is converted into a longer wavelength, converted light 26, that is outputted from the photoluminescent structure 10. Conversely, under the principle of up conversion, the excitation emission 24 is converted into a shorter wavelength light that is outputted from the photoluminescent structure 10. When multiple distinct wavelengths of light are outputted from the photoluminescent structure 10 at the same time, the wavelengths of light may mix together and be expressed as a multicolor light.

Light emitted by a light source is referred to herein as the excitation emission 24 or excitation light and is illustrated herein as solid arrows. In contrast, light emitted from the photoluminescent structure 10 is referred to herein as converted light 26 and is illustrated herein as broken arrows. The mixture of excitation emission 24 and converted light 26 that may be emitted simultaneously is referred to herein as outputted light.

The energy conversion layer 16 may be prepared by dispersing the photoluminescent material 18 in a polymer matrix to form a homogenous mixture using a variety of methods. Such methods may include preparing the energy conversion layer 16 from a formulation in a liquid carrier support medium 14 and coating the energy conversion layer 16 to a desired substrate 12. The energy conversion layer 16 may be applied to the substrate 12 by painting, screen-printing, spraying, slot coating, dip coating, roller coating, and bar coating. Alternatively, the energy conversion layer 16 may be prepared by methods that do not use the liquid carrier support medium 14. For example, the energy conversion layer 16 may be rendered by dispersing the photoluminescent material 18 into a solid-state solution (homogenous mixture in a dry state) that may be incorporated in a polymer matrix, which may be formed by extrusion, injection molding, compression molding, calendaring, thermoforming, etc. The energy conversion layer 16 may then be integrated into the substrate 12 using any methods known to those skilled in the art. When the energy conversion layer 16 includes sublayers, each sublayer may be sequentially coated to form the energy conversion layer 16. Alternatively, the sublayers can be separately prepared and later laminated or embossed together to form the energy conversion layer 16. Alternatively still, the energy conversion layer 16 may be formed by coextruding the sublayers.

In some embodiments, the converted light 26 that has been down converted or up converted may be used to excite other photoluminescent material(s) 18 found in the energy conversion layer 16. The process of using the converted light 26 outputted from one photoluminescent material 18 to excite another, and so on, is generally known as an energy cascade and may serve as an alternative for achieving various color expressions. With respect to either conversion principle, the difference in wavelength between the excitation emission 24 and the converted light 26 is known as the Stokes shift and serves as the principal driving mechanism for an energy conversion process corresponding to a change in wavelength of light. In the various embodiments discussed herein, each of the photoluminescent structures 10 may operate under either conversion principle.

Referring back to FIGS. 1A and 1B, the photoluminescent structure 10 may optionally include at least one stability layer 20 to protect the photoluminescent material 18 contained within the energy conversion layer 16 from photolytic and thermal degradation. The stability layer 20 may be configured as a separate layer optically coupled and adhered to the energy conversion layer 16. Alternatively, the stability layer 20 may be integrated with the energy conversion layer 16. The photoluminescent structure 10 may also optionally include a protective layer 22 optically coupled and adhered to the stability layer 20 or other layer (e.g., the conversion layer 16 in the absence of the stability layer 20) to protect the photoluminescent structure 10 from physical and chemical damage arising from environmental exposure. The stability layer 20 and/or the protective layer 22 may be combined with the energy conversion layer 16 through sequential coating or printing of each layer, sequential lamination or embossing, or any other suitable means.

Additional information regarding the construction of photoluminescent structures 10 is disclosed in U.S. Pat. No. 8,232,533 to Kingsley et al., entitled "PHOTOLYTICALLY AND ENVIRONMENTALLY STABLE MULTILAYER STRUCTURE FOR HIGH EFFICIENCY ELECTROMAGNETIC ENERGY CONVERSION AND SUSTAINED SECONDARY EMISSION," the entire disclosure of which is incorporated herein by reference. For additional information regarding fabrication and utilization of photoluminescent materials to achieve various light emissions, refer to U.S. Pat. No. 8,207,511 to Bortz et al., entitled "PHOTOLUMINESCENT FIBERS, COMPOSITIONS AND FABRICS MADE THEREFROM"; U.S. Pat. No. 8,247,761 to Agrawal et al., entitled "PHOTOLUMINESCENT MARKINGS WITH FUNCTIONAL OVERLAYERS"; U.S. Pat. No. 8,519,359 to Kingsley et al., entitled "PHOTOLYTICALLY AND ENVIRONMENTALLY STABLE MULTILAYER STRUCTURE FOR HIGH EFFICIENCY ELECTROMAGNETIC ENERGY CONVERSION AND SUSTAINED SECONDARY EMISSION"; U.S. Pat. No. 8,664,624 to Kingsley et al., entitled "ILLUMINATION DELIVERY SYSTEM FOR GENERATING SUSTAINED SECONDARY EMISSION"; U.S. Patent Publication No. 2012/0183677 to Agrawal et al., entitled "PHOTOLUMINESCENT COMPOSITIONS, METHODS OF MANUFACTURE AND NOVEL USES"; U.S. Pat. No. 9,057,021 to Kingsley et al., entitled "PHOTOLUMINESCENT OBJECTS"; and U.S. Patent Publication No. 2014/0103258 to Agrawal et al., entitled "CHROMIC LUMINESCENT COMPOSITIONS AND TEXTILES," all of which are incorporated herein by reference in their entirety.

According to one embodiment, the photoluminescent material 18 may include organic or inorganic fluorescent dyes including rylenes, xanthenes, porphyrins, and phthalocyanines. Additionally, or alternatively, the photoluminescent material 18 may include phosphors from the group of Ce-doped garnets such as YAG:Ce and may be a short persistence photoluminescent material 18. For example, an emission by $Ce^{3+}$ is based on an electronic energy transition from 5d1 to 4f1 as a parity allowed transition. As a result of this, a difference in energy between the light absorption and the light emission by $Ce^{3+}$ is small, and the luminescent level of $Ce^{3+}$ has an ultra-short lifespan, or decay time, of $10^{-8}$ to $10^{-7}$ seconds (10 to 100 nanoseconds). The decay time may be defined as the time between the end of excitation from the excitation emission 24 and the moment when the light intensity of the converted light 26 emitted from the photoluminescent structure 10 drops below a minimum visibility of 0.32 $mcd/m^2$. A visibility of 0.32 $mcd/m^2$ is roughly 100 times the sensitivity of the dark-adapted human eye, which corresponds to a base level of illumination commonly used by persons of ordinary skill in the art.

According to one embodiment, a $Ce^{3+}$ garnet may be utilized, which has a peak excitation spectrum that may reside in a shorter wavelength range than that of conventional YAG:Ce-type phosphors. Accordingly, $Ce^{3+}$ has short persistence characteristics such that its decay time may be 100 milliseconds or less. Therefore, in some embodiments, the rare earth aluminum garnet type Ce phosphor may serve as the photoluminescent material 18 with ultra-short persistence characteristics, which can emit the converted light 26 by absorbing purple to blue excitation emission 24 emitted from the light source 44. According to one embodiment, a ZnS:Ag phosphor may be used to create a blue converted light 26. A ZnS:Cu phosphor may be utilized to create a yellowish-green converted light 26. A $Y_2O_2S$:Eu phosphor may be used to create red converted light 26. Moreover, the aforementioned phosphorescent materials may be combined to form a wide range of colors, including white light. It will be understood that any short persistence photoluminescent material known in the art may be utilized without departing from the teachings provided herein. Additional information regarding the production of short persistence photoluminescent materials is disclosed in U.S. Pat. No. 8,163,201 to Kingsley et al., entitled "PHOTOLYTICALLY AND ENVIRONMENTALLY STABLE MULTILAYER STRUCTURE FOR HIGH EFFICIENCY ELECTROMAGNETIC ENERGY CONVERSION AND SUSTAINED SECONDARY EMISSION," the entire disclosure of which is incorporated herein by reference.

Additionally, or alternatively, the photoluminescent material 18, according to one embodiment, disposed within the photoluminescent structure 10 may include a long persistence photoluminescent material 18 that emits the converted light 26, once charged by the excitation emission 24. The excitation emission 24 may be emitted from any excitation source (e.g., any natural light source, such as the sun, and/or any artificial light source 44). The long persistence photoluminescent material 18 may be defined as having a long decay time due to its ability to store the excitation emission 24 and release the converted light 26 gradually, for a period of several minutes or hours, once the excitation emission 24 is no longer present.

The long persistence photoluminescent material 18, according to one embodiment, may be operable to emit light at or above an intensity of 0.32 mcd/m$^2$ after a period of 10 minutes. Additionally, the long persistence photoluminescent material 18 may be operable to emit light above or at an intensity of 0.32 mcd/m$^2$ after a period of 30 minutes and, in some embodiments, for a period substantially longer than 60 minutes (e.g., the period may extend 24 hours or longer, and in some instances, the period may extend 48 hours). Accordingly, the long persistence photoluminescent material 18 may continually illuminate in response to excitation from any light sources that emits the excitation emission 24, including, but not limited to, natural light sources (e.g., the sun) and/or any artificial light source 44. The periodic absorption of the excitation emission 24 from any excitation source may provide for a substantially sustained charge of the long persistence photoluminescent material 18 to provide for consistent passive illumination. In some embodiments, a light sensor may monitor the illumination intensity of the photoluminescent structure 10 and actuate an excitation source when the illumination intensity falls below 0.32 mcd/m$^2$, or any other predefined intensity level.

The long persistence photoluminescent material 18 may correspond to alkaline earth aluminates and silicates, for example doped di-silicates, or any other compound that is capable of emitting light for a period of time once the excitation emission 24 is no longer present. The long persistence photoluminescent material 18 may be doped with one or more ions, which may correspond to rare earth elements, for example, Eu2+, Tb3+ and/or Dy3. According to one non-limiting exemplary embodiment, the photoluminescent structure 10 includes a phosphorescent material in the range of about 30% to about 55%, a liquid carrier medium in the range of about 25% to about 55%, a polymeric resin in the range of about 15% to about 35%, a stabilizing additive in the range of about 0.25% to about 20%, and performance-enhancing additives in the range of about 0% to about 5%, each based on the weight of the formulation.

The photoluminescent structure 10, according to one embodiment, may be a translucent white color, and in some instances reflective, when unilluminated. Once the photoluminescent structure 10 receives the excitation emission 24 of a particular wavelength, the photoluminescent structure 10 may emit any color light (e.g., blue or red) therefrom at any desired brightness. According to one embodiment, a blue emitting phosphorescent material may have the structure $Li_2ZnGeO_4$ and may be prepared by a high temperature solid-state reaction method or through any other practicable method and/or process. The afterglow may last for a duration of two to eight hours and may originate from the excitation emission 24 and d-d transitions of $Mn^{2+}$ ions.

According to an alternate non-limiting exemplary embodiment, 100 parts of a commercial solvent-borne polyurethane, such as Mace resin 107-268, having 50% solids polyurethane in toluene/isopropanol, 125 parts of a blue green long persistence phosphor, such as Performance Indicator PI-BG20, and 12.5 parts of a dye solution containing 0.1% Lumogen Yellow F083 in dioxolane may be blended to yield a low rare earth mineral photoluminescent structure 10. It will be understood that the compositions provided herein are non-limiting examples. Thus, any phosphor known in the art may be utilized within the photoluminescent structure 10 without departing from the teachings provided herein. Moreover, it is contemplated that any long persistence phosphor known in the art may also be utilized without departing from the teachings provided herein.

Additional information regarding the production of long persistence photoluminescent materials is disclosed in U.S. Pat. No. 8,163,201 to Agrawal et al., entitled "HIGH-INTENSITY, PERSISTENT PHOTOLUMINESCENT FORMULATIONS AND OBJECTS, AND METHODS FOR CREATING THE SAME," the entire disclosure of which is incorporated herein by reference. For additional information regarding long persistence phosphorescent structures, refer to U.S. Pat. No. 6,953,536 to Yen et al., entitled "LONG PERSISTENT PHOSPHORS AND PERSISTENT ENERGY TRANSFER TECHNIQUE"; U.S. Pat. No. 6,117,362 to Yen et al., entitled "LONG-PERSISTENT BLUE PHOSPHORS"; and U.S. Pat. No. 8,952,341 to Kingsley et al., entitled "LOW RARE EARTH MINERAL PHOTOLUMINESCENT COMPOSITIONS AND STRUCTURES FOR GENERATING LONG-PERSISTENT LUMINESCENCE," all of which are incorporated herein by reference in their entirety.

Referring now to FIGS. 2-6, reference numeral 40 generally designates a vehicle having a first panel 44. The first panel 44 defines a vent 48 thereon. A second panel 52 is positioned proximate the first panel 44. A lighting assembly 56 is positioned within the vent 48. The lighting assembly 56 includes a first plurality of light sources 60, a second plurality of light sources 64, a heat sink 68, and an optical member 72. The heat sink 68 is thermally coupled with the first and second plurality of light sources 60, 64. The photoluminescent structure 10 is positioned proximate the first panel 44.

Figure 2:
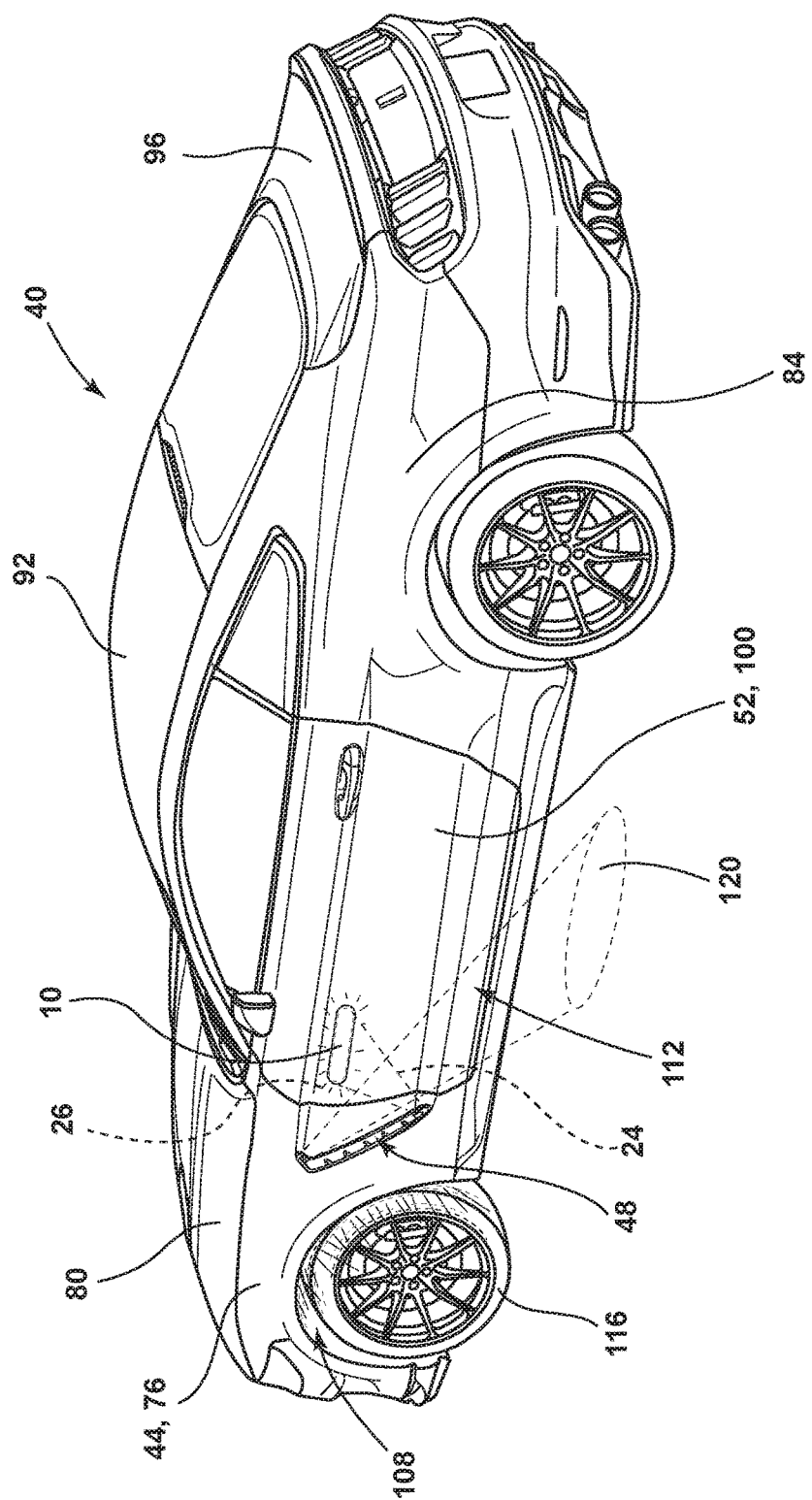
FIG. 2 is a side perspective view of a vehicle equipped with a light assembly, according to one embodiment.

Referring now to FIG. 2, the vehicle 40 is depicted as a car, but the disclosure provided herein may equally be applied to vans, sport utility vehicles, pickup trucks, sedans or any other type of automobile. In the depicted embodiment, the first panel 44 is shown as a front fender 76, but it will be understood that the first panel may be other body panels and panels of the vehicle 40. For example, the first panel may be a hood 80, a rear fender 84, a bumper, a roof 92, and/or a trunk lid 96. Similar to the first panel 44, the second panel 52 is depicted as a door 100 but may be the hood 80, the rear fender 84, the bumper 88, the roof 92, the trunk lid 96, or any other body panel located on the vehicle 40. As shown, the first panel 44 defines the vent 48. The vent 48 is an aperture configured to allow air to pass between a wheel well 108 and a side 112 of the vehicle 40. According to various embodiments, the vent 48 is configured to draw air in through the wheel well 108 while the vehicle is moving and pass it to the side 112 of the vehicle 40. The vent 48 may be fully defined by the first panel 44, or by a combination of panels. Providing an air flow through the vent 48 may be advantageous in increasing aerodynamics of the vehicle 40, cooling a wheel 116 located within the wheel well 108, or cooling a brake system coupled with the wheel 116 located within the wheel well 108. Further, as explained in greater detail below, the air flow to the vent 48 may further be configured to cool the heat sink 68 of the lighting assembly 56. The lighting assembly 56 positioned within the vent 48 is configured to emit light onto the door 100, onto the photoluminescent structure 10, into the wheel well 108, and form a puddle lamp 120 on a ground next to the door 100 of the vehicle 40. The puddle lamp 120 may be configured to illuminate the ground below the vehicle 40 such that as an occupant is entering or exiting the vehicle 40, puddles and/or other debris proximate the vehicle 40 may be illuminated and avoided. Further, as explained below, the lighting assembly 56 is configured to emit a plurality of types of light from the vent 48. For example, the lighting assembly 56 may emit the excitation emission 24, visible light, colored light, white light and/or non-visible light. The excitation emission 24 emanating from the vent 48 onto the door 100 may fall on a decal (e.g., the photoluminescent structure 10) which may cause the decals to emit the converted light 26. The decal may take a variety of configurations including alpha-numeric text, symbols and/or pictures. For example, the decal may indicate a make or model of the vehicle 40 and/or include a graphic (e.g., flames or a symbol of the manufacturer of the vehicle 40). Further, the decal may include a plurality of photoluminescent structures 10 each configured to be activated by a different excitation emission 24.

Figure 3:
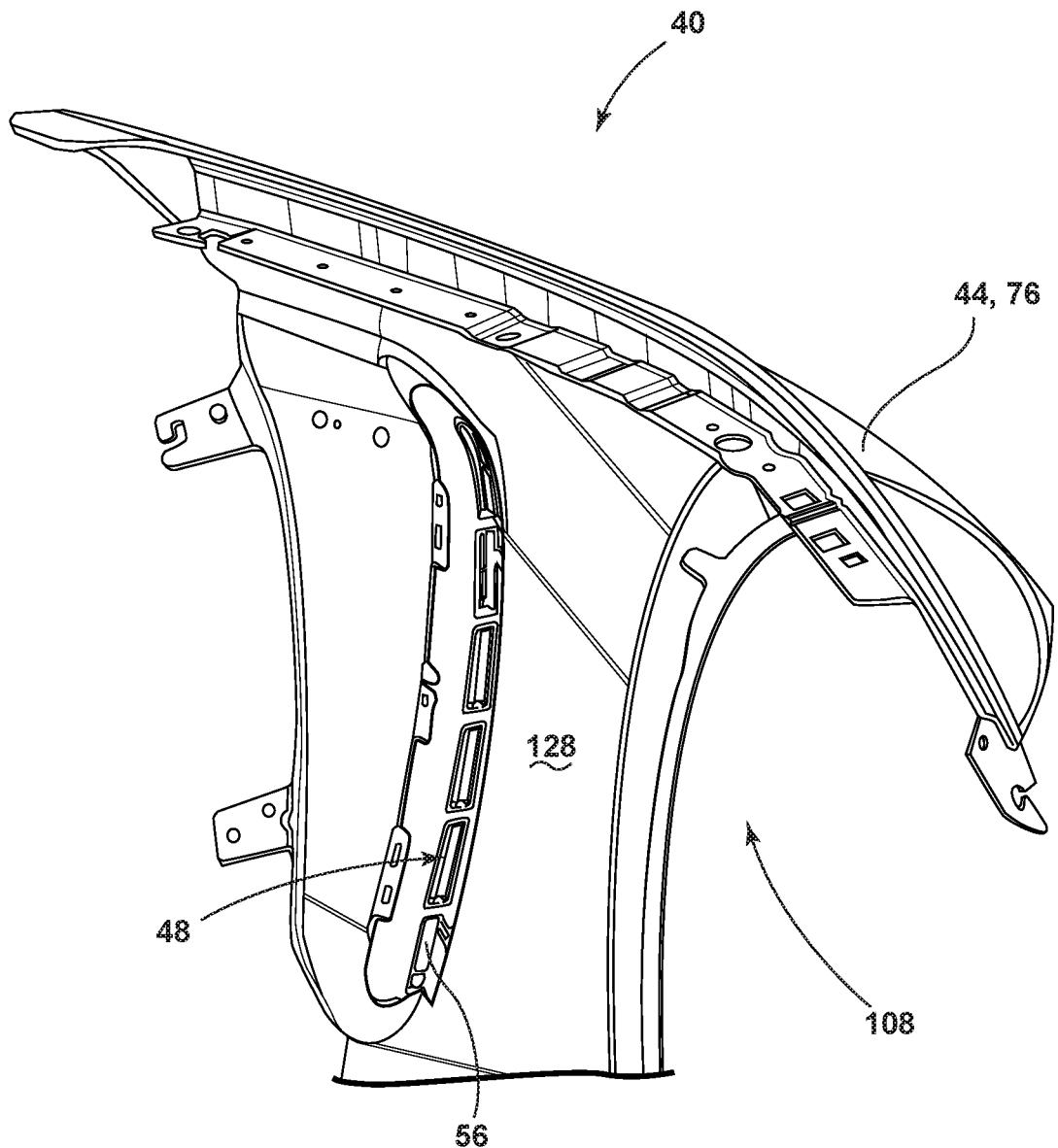
FIG. 3 is a perspective view of a panel and the light assembly of the vehicle, according to one embodiment.
Figure 4:
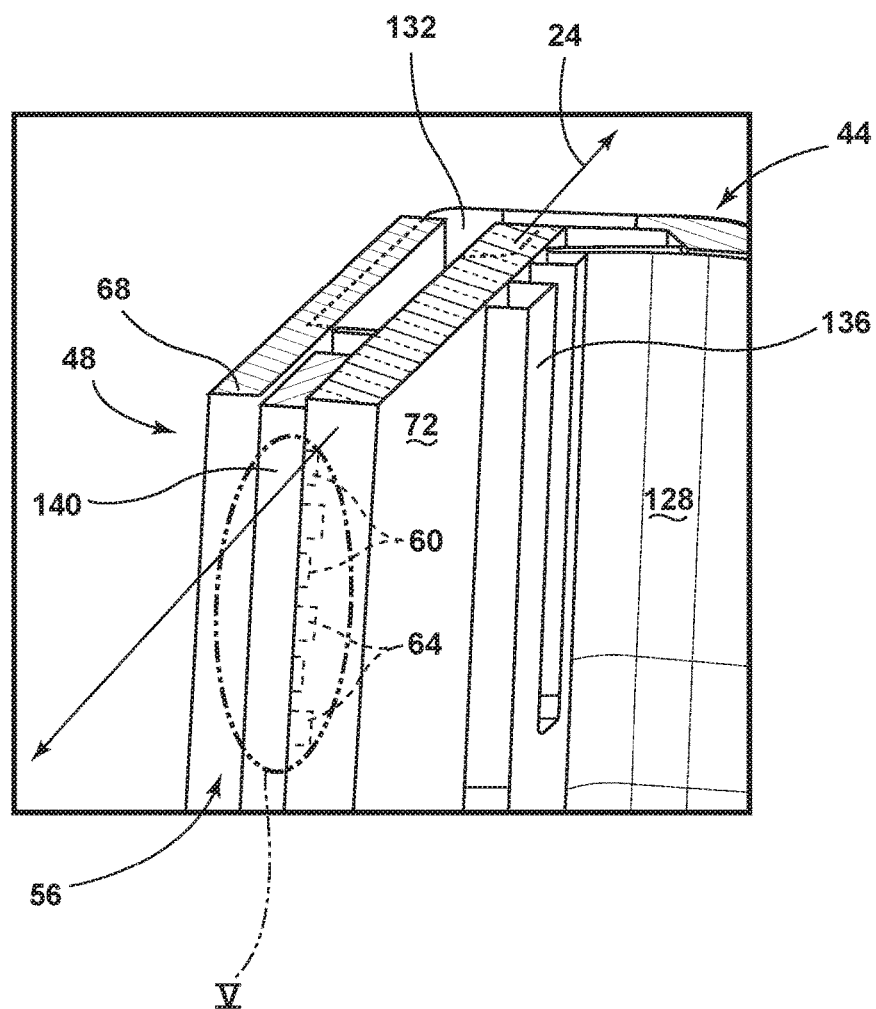
FIG. 4 is a cross-sectional view of the panel taken at line IV of FIG. 3, according to one embodiment.

Referring now to FIGS. 3 and 4, the lighting assembly 56 is positioned on an internal surface 128 of the first panel 44 within the vent 48. The lighting assembly 56 is positioned on the internal surface 128 of the first panel 44 such that the optical member 72 may transmit light into the wheel well 108 as well as toward the side 112 of the vehicle 40. In the depicted embodiment, the lighting assembly 56 is positioned on the internal surface 128 such that the optical member 72 is in contact with the internal surface 128, the first and second light sources 60, 64 are optically coupled to the optical member 72 and the heat sink 68 is in contact with the air flow through the vent 48. The first panel 44 defines a concealment flange 132 and a retaining flange 136. The lighting assembly 56 is configured to be retained between the concealment flange 132 and the retaining flange 136. In alternate constructions, the lighting assembly 56 may be retained to the first panel 44 by an adhesive and/or other mechanical fastening system (e.g., screws, clips, etc.). The concealment flange 132 is positioned vehicle rearward of the lighting assembly 56 such that when the vent 48 and first panel 44 is viewed from a vehicle rearward perspective, the lighting assembly 56 may be concealed behind the concealment flange 132. The concealment flange 132 may be composed of a polymeric material which is translucent, transparent, or clear. In a specific example, the concealment flange 132 may include a vacuum metallized layer such that it is both reflective and transmissive. The concealment flange 132 is configured to allow light emitted from the first and second pluralities of light source 60, 64 into the optical member 72 to be transmitted in a vehicle rearward direction from the vent 48 toward the photoluminescent structure 10, the side 112 of the vehicle 40, and to the location of the puddle lamp 120. The optical member 72 may include one or more optics positioned proximate the concealment flange 132 to direct the light and the excitation emission 24 of the first and second pluralities of light sources 60, 64 toward the desired location on or proximate the vehicle 40. For example, separate optics may be defined by, or positioned proximate the optical member 72 to form the puddle lamp 120, form the general illumination of the side 112 of the vehicle 40 and/or illuminate the decal. Further, optics may be formed to illuminate the door 100 while it is in an open position. The optical member 72 extends over the first and second pluralities of light sources 60, 64 and may extend, as depicted, more vehicle rearwardly than the first and second pluralities of light sources 60, 64. In the depicted embodiment, the optical member 72 may allow emission of light toward the wheel well 108, as well as toward the internal surface 128. For example, in the depicted configuration, the retaining flange 136 extends over only a portion of the optical member 72. Accordingly, light may be emitted from the optical member 72 toward the internal surface 128 in areas not covered by the retaining flange 136. The heat sink 68 is positioned on the opposite side of the first and second pluralities of light sources 60, 64 from the optical member 72. The heat sink 68 is in thermal communication with the flow of air passing through the vent 48 from the wheel well 108 to the side 112 of the vehicle 40. By thermally coupling the heat sink 68 with the air passing through the vent 48, heat generated by the first and second pluralities of light sources 60, 64 that passes to the heat sink 68 may be dissipated into the air thereby allowing a greater production of light from the first and second pluralities of light sources 60, 64 while the vehicle 40 is in motion.

Figure 5:
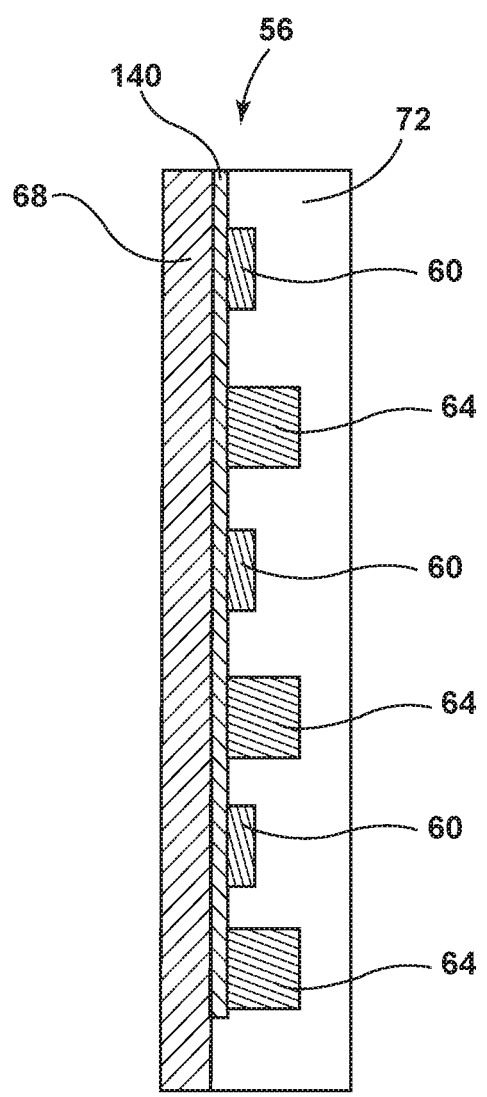
FIG. 5 is an enhanced view taken at section V of FIG. 4, according to one embodiment.

Referring now to FIGS. 4 and 5, the light producing assembly 56 includes the heat sink 68, a printed circuit board 140, the first and second pluralities of light sources 60, 64 and the optical member 72. According to various embodiments, the printed circuit board 140 is positioned between the heat sink 68 and the optical member 72. Such a configuration may provide protection to the printed circuit board 140 from environmental exposure and hazards (e.g., dirt, water, grime, etc.). The heat sink 68 may be composed of a material capable of high heat conduction and having a high heat capacity. For example, the heat sink 68 may be formed of a metal and/or a polymeric material with a high heat capacity. According to some embodiments, the heat sink 68 may further define one or more fins or other features configured to increase the surface area of the heat sink 68 in contact with the air flow through the vent 48. An increased surface area of the heat sink 68 with the airflow may provide an increased heat conduction to the air.

The first and second pluralities of light sources 60, 64 are positioned on and electrically connected with the printed circuit board 140. The first and/or second pluralities of light sources 60, 64 may be configured to emit blue light, white light, colored light, nonvisible (e.g., ultraviolet and or infrared) or a mixture thereof. According to one embodiment, the first plurality of light sources may be configured as side emitting light sources. The side emitting light sources of the first plurality of light sources 60 are configured to emit light down a length of the optical member 72 (e.g., generally down a length of the vehicle 40). The side emitting light sources of the first plurality of light sources 60 may be arranged in an alternating manner or in another pattern or random orientation such that light is emitted in each direction (e.g., toward the side 112 of the vehicle 40 or toward the wheel well 108) along the optical member 72. For light sources of the first plurality of light sources 60 configured to emit light toward the side 112 of the vehicle 40, a portion of the light sources may be configured to emit the excitation emission 24 while another portion may be configured to emit visible light. Use of a first portion which emits the excitation emission 24 and a second portion which emits visible lights may allow light emitting from the vent 48 toward the side 112 of the vehicle 40 to both excite the decal (e.g., photoluminescent structure 10), while also providing ambient illumination to the side 112 of the vehicle 40 as explained in greater detail below. The second plurality of light sources 64 may include top emitting diodes configured to emit light into the optical member 72. The top emission configuration of the second plurality of light sources 64 provides light to the optical member 72 which may be emitted toward the wheel well 108, toward the internal surface 128 and/or toward the side 112 of the vehicle 40.

The optical member 72 is optically coupled with both the first and the second pluralities of light sources 60, 64. The optical member 72 may be overmolded onto the printed circuit board 140 and the first and second pluralities of light sources 60, 64. The optical member 72 may be translucent, transparent, and/or clear material configured to propagate light. The optical member 72 may be formed of a polymeric material such as silicone, poly(methyl methacrylate), polyethylene, polypropylene and/or other transparent polymers. The optical member 72 may further be configured to function as an additional heat sink to absorb heat generated by the first and second pluralities of light sources 60, 64. In such an embodiment, the optical member 72 may include one or more metals configured to increase the heat capacity and/or heat conduction properties of the optical member 72. The optical member 72 may be over-molded onto the printed circuit board 140 such that the first and second pluralities of light sources 60, 64 are within the optical member 72.

Figure 6:
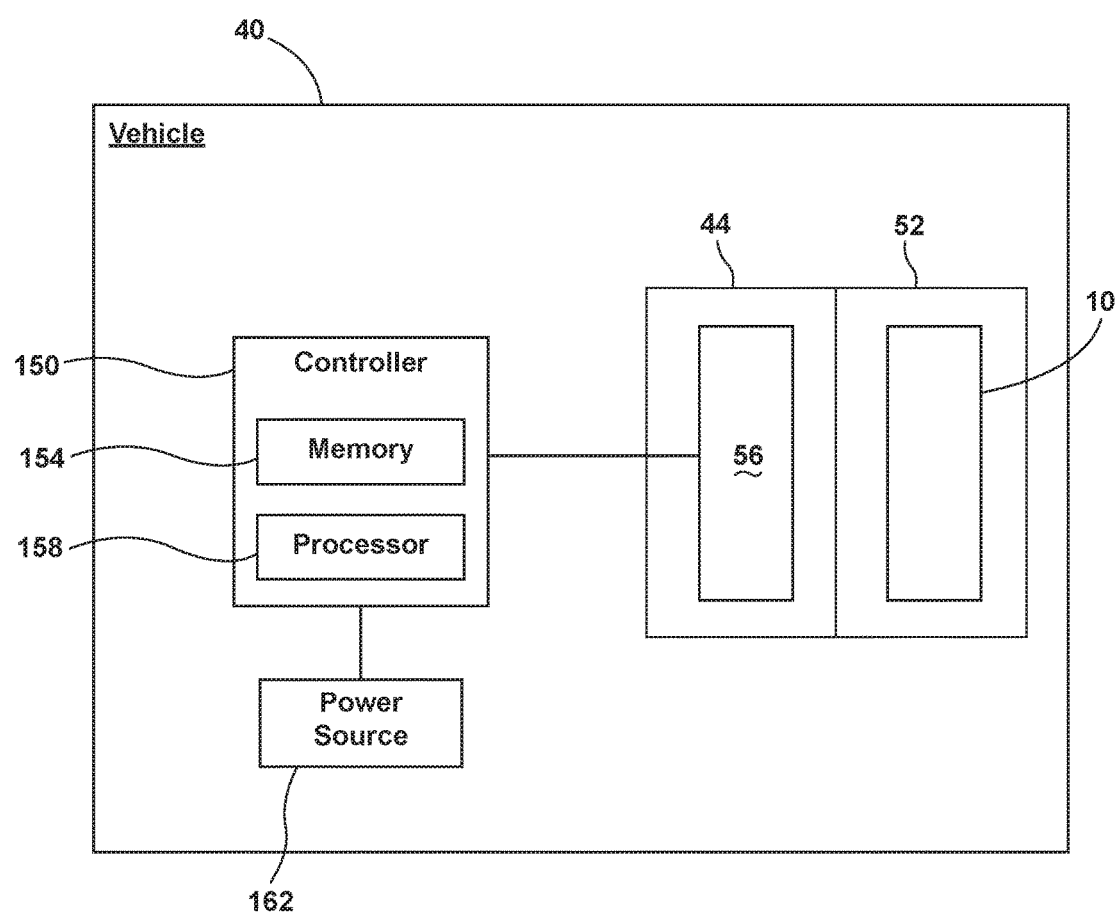
FIG. 6 is a block diagram of the vehicle and the lighting system.

Referring now to FIG. 6, a block diagram of the vehicle 40 is shown in which the light assembly 56 is implemented. The vehicle 40 includes a controller 150 in communication with the lighting assembly 56. The controller 150 may include memory 154 having instructions contained therein executed by a processor 158 of the controller 150. The controller 150 may provide electrical power to the lighting assembly 56 by a power source 162 located onboard the vehicle 40. The memory 154 may include variety of routines configured to control the light assembly 56 that may be executed by the controller 150. In a first example, the memory 154 may contain instructions to vary which light sources of the first plurality of light sources 60 are activated in order to achieve a desired affect from the photoluminescent structure 10. For example, different light sources of the first plurality of light sources 60 may be activated based on the type of excitation emission 24 emitted which may thereby cause different portions of the photoluminescent structure 10 to be activated and emit the converted light 26. Such an effect may give the photoluminescent structure 10 the appearance of movements and/or color change based on the order of light sources activated by the controller 150. In a second example, the memory 154 may contain instructions for specific lighting patterns based on sensed vehicle conditions (e.g., welcome, farewell, and movement, stationary). For example, a portion or all of the first and/or second pluralities of light sources 60, 64 may be activated such that a desired color or lighting pattern is affected within the wheel well 108 and/or along the side 112 of the vehicle 40. For example, while in motion, the lighting assembly 56 may be configured to illuminate (e.g., in amber colored light) the side 112 of the vehicle 40 to increase visibility if a day/night sensor of the vehicle 40 detects low lighting proximate the vehicle 40. In another example, when the vehicle 40 is stationary, the lighting assembly 56 may illuminate the wheel well 108 and/or the side 112 of the vehicle 40 in a desired ambient lighting for both welcoming and farewell events as the driver of the vehicle 40 approaches or leaves the car (e.g., as sensed by the presence of a key fob). In a third example, the lighting assembly 56 may be configured to activate specific light sources (e.g., a portion of the light sources of the first and/or second pluralities of light sources 60, 64) based on optics located on the optical member 72 such that certain portions of the side 112 of the vehicle 40 may be illuminated and/or to create the puddle lamp 120 proximate the vehicle 40. In a fourth example, the controller 150 may utilize data from a moisture or rain sensor of the vehicle 40 to determine if the puddle lamp 120 should be activated.

Use of the present disclosure may offer a variety of advantages. First, use of a heat conductive polymeric embodiment of the heat sink 68 allows for heat generated by the lighting assembly 56 to be dissipated into the air passing through the vent 48. As light emitting diodes are operated, heat is generated and a light production of the light emitting diodes may decrease. By dissipating the heat from the light assembly 56 into the air of the vent 48, an increased light production from the light assembly 56 may be achieved while the vehicle 40 is in operation. Further, polymeric examples of the heat sinks 68 may allow for increased robustness of the lighting assembly 56 to debris and environmental exposure. Second, providing illumination in a rearward direction from the vent 48 by the lighting assembly 56 may increase safety and aesthetic appeal of the vehicle 40. For example, by illuminating the side 112 of the vehicle 40, both the visibility under low lighting conditions as well as the aesthetic appearance of the vehicle 40 may be increased. Further, by creating the puddle lamp 120 on the ground proximate the vehicle 40, an increased safety for the users of the vehicle 40 may be achieved by highlighting puddles and/or debris proximate the vehicle 40. Third, use of the concealment flange 132 allows for the optical member 72 to be concealed from viewing which may increase the aesthetics of the vehicle 40. Fourth, by utilizing the disclosed lighting assembly 56, a variety of aesthetic lighting effects may be achieved without having to position the lighting assembly 56 on the door 100 (i.e., which may be subject to a variety of package space requirements).

The following disclosure describes an illumination system for a vehicle configured to illuminate a portion of the vehicle as well as a surface beneath or behind a vehicle. In some embodiments, a light source may be utilized to illuminate both the surface beneath the vehicle and the vehicle. The light source may be configured to emit light at a first wavelength or primary emission to excite a photoluminescent structure. The photoluminescent structure may be disposed on a body feature of the vehicle and be configured to convert the first wavelength of the light or the primary emission into a second wavelength or secondary emission. The first wavelength of the light may correspond to a first color of light and the second wavelength may correspond to a second color of light, different from the first color. While the various embodiments of the illumination system described herein refer to specific structures demonstrated in reference to at least one automotive vehicle, it will be appreciated that the vehicle illumination system may be utilized in a variety of applications.

For the purposes of describing and defining the present teachings, it is noted that the terms "substantially" and "approximately" are utilized herein to represent the inherent degree of uncertainty that may be attributed to any quantitative comparison, value, measurement, or other representation. The terms "substantially" and "approximately" are also utilized herein to represent the degree by which a quantitative representation may vary from a stated reference without resulting in a change in the basic function of the subject matter at issue.

It is to be understood that variations and modifications can be made on the aforementioned structure without departing from the concepts of the present invention, and further it is to be understood that such concepts are intended to be covered by the following claims unless these claims, by their language, expressly state otherwise.

What is claimed is:

1. A vehicle, comprising:
   a first panel on a side of the vehicle defining a vent;
   a second panel separately positioned proximate the first panel;
   a lighting assembly positioned proximate the vent, comprising:
      first and second pluralities of light sources;
      a heat sink thermally coupled with the first and second pluralities of light sources; and
      an optical member optically coupled to the first and second plurality of light sources; and
   a photoluminescent structure positioned on the second panel.

2. The vehicle of claim 1, wherein the optical member is configured to form a puddle light proximate the second panel.

3. The vehicle of claim 1, wherein at least one of first and second pluralities of light sources are configured to emit an excitation emission configured to excite the photoluminescent structure into emitting light.

4. The vehicle of claim 1, wherein the first plurality of light sources comprises side emitting light sources.

5. The vehicle of claim 1, wherein the first body panel is vacuum metallized proximate the optical member.

6. The vehicle of claim 1, wherein the heat sink is in thermal communication with air within the vent.

7. The vehicle of claim 6, wherein the heat sink comprises a polymeric material.

8. A vehicle, comprising:
   a first body panel on a side of the vehicle defining a vent;
   a second panel separately positioned proximate the vent;
   a lighting assembly positioned within the vent, comprising:
      a first plurality and a second plurality of light sources; and
      an optical member optically coupled to the first and second plurality of light sources; and
   a photoluminescent structure positioned on the second panel.

9. The vehicle of claim 8, wherein the vent is configured to allow air flow through the first body panel.

10. The vehicle of claim 9, wherein the lighting assembly further comprises a polymeric heat sink.

11. The vehicle of claim 10, wherein the polymeric heat sink is in thermal communication with the air flow through the first body panel.

12. The vehicle of claim 8, wherein the first body panel is vacuum metallized proximate the optical member.

13. The vehicle of claim 8, wherein the optical member is configured to emit an excitation emission from at least one of the first and second pluralities of light sources onto the photoluminescent structure.

14. The vehicle of claim 13, wherein the photoluminescent structure emits light in response to the excitation emission.

15. A vehicle, comprising:
   a fender panel defining a vent and a wheel well;
   a lighting assembly positioned within the vent, comprising:
      a plurality of light sources; and
      an optical member optically coupled to the plurality of light sources; and
   a photoluminescent structure separately positioned from the lighting assembly and proximate the vent, the optical member configured to emit light from the plurality of light sources toward the wheel well and the photoluminescent structure.

16. The vehicle of claim 15, wherein the photoluminescent structure is configured to emit light in response to receiving light from the optical member.

17. The vehicle of claim 16, wherein the optical member is further configured to emit the light from the plurality of light sources as a puddle lamp proximate the vehicle.

18. The vehicle of claim 17, wherein the light assembly further comprises a heat sink in thermal communication with air within the vent.

19. The vehicle of claim 18, wherein the heat sink comprises a polymeric material.

20. The vehicle of claim 19, wherein the plurality of light sources comprises at least one side emitting light source.

* * * * *